United States Patent
Frändberg

[11] Patent Number: 5,498,108
[45] Date of Patent: Mar. 12, 1996

[54] ANCHORING DEVICE

[76] Inventor: Lars Frändberg, Gyttorp, S-713 82 Nora, Sweden

[21] Appl. No.: 941,126
[22] PCT Filed: Mar. 4, 1991
[86] PCT No.: PCT/SE91/00168
  § 371 Date: Nov. 3, 1992
  § 102(e) Date: Nov. 3, 1992
[87] PCT Pub. No.: WO91/14106
  PCT Pub. Date: Sep. 19, 1991

[30] Foreign Application Priority Data

Mar. 5, 1990 [SE] Sweden .................. 9000764

[51] Int. Cl.$^6$ .............. F21D 21/00; F16B 2/02
[52] U.S. Cl. ............. 405/259.1; 411/78; 411/80
[58] Field of Search ................ 405/244, 259.1, 405/259.3, 259.4; 411/24, 75, 76, 78, 79, 80

[56] References Cited

U.S. PATENT DOCUMENTS 3,478,641 11/1969 Dohmeier ...................... 85/79
4,669,935 6/1987 Herb .......................... 411/39

FOREIGN PATENT DOCUMENTS 0226829 7/1987 European Pat. Off. .
2914739 10/1980 Germany .
329936 10/1970 Sweden .

OTHER PUBLICATIONS

Derwent's abstract, No. 89–346 791/47, SU 1 460 444, publ. week 8947 (Kuib Vniiproektelek).
Derwent's abstract No. C25 41 D/11, SU 731 104 publ. week 8111 (Olkhin SA).

Primary Examiner—David H. Corbin
Attorney, Agent, or Firm—Thomas J. Engellenner; Edward J. Kelly; Lahive & Cockfield

[57] ABSTRACT

An anchoring device comprises an elongated element (1) introduceable into a hole (10) and means for securing the element against withdrawal from the hole. The securing means comprise at least one part (5, 13, 16) movably connected to the elongated element (1) and adapted to project transversely beyond the periphery of the element to be brought into contact with a wall (12) of the hole. The part is adapted to move, on traction of the element (1) introduced into the hole (10) in a direction out of the hole, relative to the element (1) by means of friction generation against the hole wall (12) while increasing the combined transverse dimension of element (1) and part (5, 13, 16) to the corresponding transverse dimension of the hole and to tend to increase this combined transverse dimension further on continued traction in the element.

18 Claims, 4 Drawing Sheets

ANCHORING DEVICE

FIELD OF THE INVENTION AND PRIOR ART

The present invention is related to an anchoring device comprising an elongated element introducable into a hole and means for securing the element against withdrawal from the hole.

Such anchoring devices may be used for securing various objects, such as electric cables, ventilation ducts and cabinets, relative to house walls and ceilings, rock walls and similar. In this type of devices the securing means is adapted to directly or indirectly co-act with the wall of the hole, said means possibly being formed by threads cut in the elongated element and adapted to engage in the wall of the hole or a plug introduced into the hole, various types of expanding members, which are pressed apart and against the wall of the hole when hammering a bolt into a hole, and numerous similar means.

One thing is, however, common to all these devices previously known: they are expensive to manufacture since they require a fine-mechanical work, which is of a high precision and most often relatively extensive. Another disadvantage associated to the devices previously known is that they only can be used, once they have been produced, for a certain hole dimension or hole dimensions lying within a very limited range. Furthermore, it is generally necessary to design the securing means so that they are suitable for securing relative to a hole wall of a particular material or a particular type of material, e.g. rock, wood or the like. For anchoring in underlayers of another type of material than the one, for which the device in question is adapted, various types of adjustment means are necessary, such as plugs, sleeves and the like.

SHORT DESCRIPTION OF THE INVENTION

The object of the present invention is to provide a device of the kind mentioned by way of introduction, said device being more simple and more non-expensive to produce than the previously known devices of this type and capable of being used for holes having somewhat differing dimensions and differing wall material characters; the device should at the same time have an operational capacity at least as good as but preferably improved relative to the previously known devices in respect of anchorage capacity.

This object is according to the invention obtained by providing a device of the nature defined by way of introduction with the features enumerated in the characterizing part of the enclosed claim 1.

Since the securing means comprise the part movably connected to the elongated element and this part is adapted to move, on attempt to withdraw the element from a hole, by generation of friction against the hole wall, relative to the element while increasing the combined transverse dimension of the element and part, it is possible to achieve a very efficient anchorage of the element in the hole in question. The element and part may easily be produced so that the device may be used for anchoring in holes with differing transverse dimensions. Since the movable part is adapted to move outwardly from the elongated element on attempt to withdrawal from the hole, securing may occur relative to hole walls of the most different materials and types since it is not necessary in practice that the movable part is able to engage in the hole wall with its peripherical portions, but the wedge action obtained by the movable part in co-operation with the elongated element and the hole wall suffices.

It is also possible to maintain the production costs for an anchoring device according to the invention at a very low level since no machining over the general extent of the elongated element or complicated forming of various types of tines or similar are required. No excessively high precision is required on production of the elongated element or the movable part and this is of course favourable for the production costs.

Another advantage with the device according to the invention is that it easily may be designed so that attempts to additionally introduce an element anchored in a hole into said hole cause a movement backwardly of the movable part in a direction reducing the transverse dimension, so that the element is released and may be drawn out of the hole without securing by means of the movable part. It is defined in the dependent claims and described hereinafter how this can be realized.

Further advantages and preferable features of the invention will appear from the dependent claims and the following description.

SHORT DESCRIPTION OF THE DRAWINGS

Preferable embodiments of the device according to the invention given as examples are described hereunder with reference to the appended drawings, in which.

DETAILED DESCRIPTION OF PREFERRED EMBODIMENTS OF THE INVENTION

Figure 1:
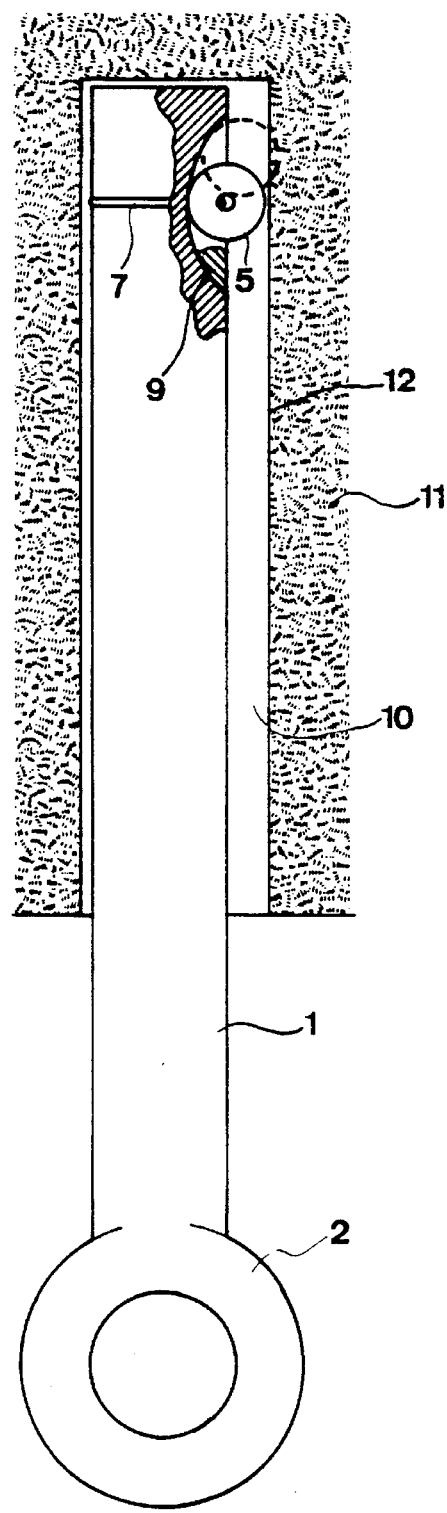
FIG. 1 is a simplified, partly cut view of an anchoring device according to the invention in a position introduced into a hole.
Figure 2:
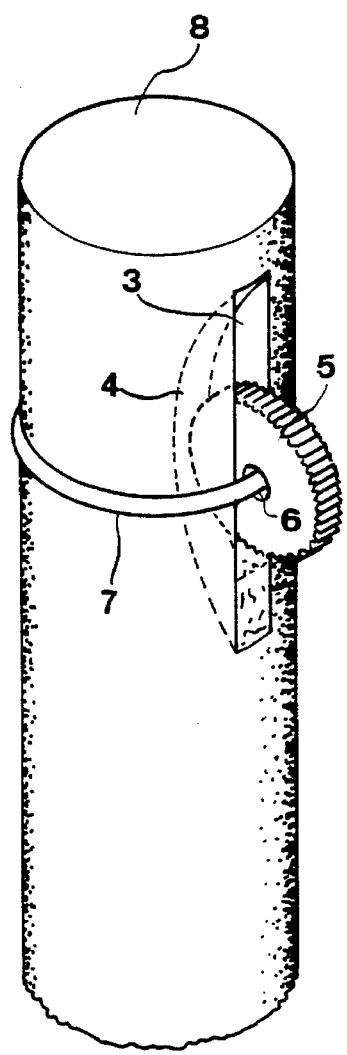
FIG. 2 is a detailed view of one extreme end portion of the device according to FIG. 1.
Figure 4:
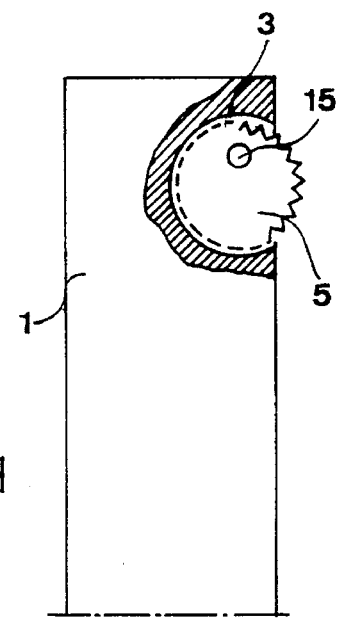
FIG. 4 is a simplified, partly cut side view of the extreme end portion according to a third preferred embodiment of the invention.

FIGS. 1 and 4 illustrate a first embodiment of the device according to the invention, said embodiment consisting of an elongated, rod like element 1, which at one end is provided with an eye or a ring 2 for suspension of e.g. an electric cable, a water hose or the like. A hook or any other arbitrary member may be provided instead of a ring and it would even be possible that such a member would be absent in case the element portion projecting out of the hole alone would fulfil a certain function. The element 1 is at its other end provided with a lateral recess 3 having an arc shaped bottom surface 4. A toothed wheel 5 is received in the recess 3 and rests on the bottom surface 4. A through hole 6 is arranged in the center of the toothed wheel (5). An elastic rubber band 7 is caused to pass through the hole 6 of the toothed wheel 5 and is laid around the element 1. The rubber band 7, bottom surface 4 and toothed wheel 5 co-operate so that rubber band 7 accumulates a minimum of potential energy when the periphery of the toothed wheel 5 rests on the deepest location of the recess 3, i.e. with the toothed wheel 5 projecting as little as possible out of recess 3 (see FIG. 2). At that end of the recess 3 which is opposite to the extreme end 8 of the element there is arranged a stop member 9 for preventing movement of the toothed wheel 5 out of the recess 3 in a direction away from the extreme end 8 of the element when friction occurs between the toothed wheel and the hole wall on introduction of the element into the hole.

The recess 3 is obtained with preference and in a very simple way by means of an angle grinder. The stop member 9 is then positioned, preferably in the form a welding spot.

The operation of the device just described is as follows: when one wishes to anchor something in a wall, a ceiling or the like in a house, a rock or in relation to any other solid body, an elongated hole 10 is initially bored or achieved in any other way in the underlayer 11. The hole 10 has a diameter which is larger than the combined transverse dimension of element 1 and that part of toothed wheel 5 which projects out of recess 3. For this reason it is possible to move the elongated element into hole 10 without this being prevented by toothed wheel 5. If the toothed wheel 5 inadvertently would contact the hole wall 12 the welding spot 9 will nevertheless prevent the toothed wheel 5 from moving in a direction away from the extreme end 8 and out of the recess 3. When the elongated element 1 has been introduced as far as desired into hole 10, the element is moved somewhat to the side (to the right as viewed in FIG. 1) so that the teeth of the toothed wheel 5 enter into friction generating contact with hole wall 12. Traction of element 1 in a direction out of the hole 10 is then initiated. The friction between toothed wheel 5 and hole wall 12 will cause the toothed wheel to rotate counter clockwise as viewed in FIG. 1 and the wheel will move on the bottom surface 4 of the recess towards the extreme end 8 and accordingly obliquely out from the recess 3 while stretching the rubber band 7. The combined transverse dimension of element 1 and toothed wheel 5 will then increase to the diameter of hole 10, whereupon continued traction in element 1 in a direction out of hole 10 will bring toothed wheel 5 to tend to increase this combined transverse dimension further. The element 1 is thereby effectively clamped in the hole 10. The wedge action obtained is enhanced by the bottom surface 4 presenting an arc shape such that its angle in relation to the longitudinal direction of element 1 increases progressively towards the periphery of the element and in a direction towards the extreme end 8.

Although a very efficient anchoring of element 1 in hole 10 is obtained by means of the device according to the invention, element 1 may easily be released and removed from hole 10 to be used in any new connection or be stored for later use, by applying some weak impacts on the ring 2 in the longitudinal direction of the element, whereby toothed wheel 5 will rotate clockwise as viewed in FIG. 1 and move downwardly towards the deepest location of recess 3, whereupon element 1 may be withdrawn from the hole. This possibility to multiplied use of the device according to the invention contributes, in addition to the simple manufacturing of the device, to the very favourable cost of the device.

Figure 3:
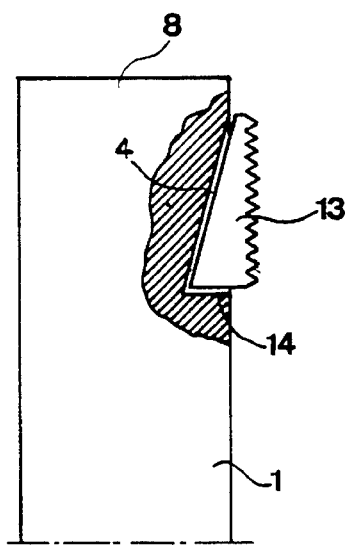
FIG. 3 is a simplified, partly cut side view of the extreme end portion of a second preferred embodiment of the invention.

A second preferred embodiment of the device according to the invention is illustrated very diagrammatically in FIG. 3. This embodiment differs from the embodiment according to FIGS. 1 and 2 by the toothed wheel having been replaced by a generally triangular movable part 13, which has a surface turned away from the element 1 provided with engagement or friction generating members in the form of teeth. The recess 3 of element 1 presents a triangular shape generally complementary to part 13. It is conceived that the triangular movable part 13 in a position of rest should be retained in the position according to FIG. 3 by means of an elastic member not illustrated but secured to the part and laid around element 1. When introducing element 1 into a hole in an underlayer inadvertent contact of the teeth of the triangular part and the hole wall will cause the shortest side or in this case the cathetus of the part to be pressed against that part 14 of surface 4 which is turned away from the extreme end 8. Thus, the surface part 14 will act as a stop member. When it is attempted to withdraw element 1 from the hole and when simultaneously the teeth of the triangular part 13 contact the hole wall, the triangular part will move along surface 4 in an oblique direction towards the extreme end 8 of the element. The combined transverse dimension of element 1 and part 13 will then increase and part 13 will be wedged between element 1 and the hole wall so that element 1 effectively is retained in place. Also in this embodiment the element may be released by impacts on the end projecting out of the hole in the manner described hereinabove in relation to FIGS. 1 and 2.

A part of the element 1 of a third embodiment of the device according to the invention is illustrated very diagrammatically in FIG. 4. A recess 3 is arranged in element 1. An axle 15 is arranged in the side walls of this recess, a toothed wheel 5 being excentrically rotatably arranged about said axle. After introduction of element 1 into a hole and movement of the periphery of the toothed wheel 5 into friction generating contact with the hole wall, the toothed wheel 5 will, on attempts to withdrawal of element 1 from the hole, rotate counter clockwise as viewed in FIG. 4 about axle 15. Due to the excentrical arrangement of the toothed wheel, this involves an increase of the combined transverse dimension of the element and toothed wheel and a resulting wedging in the manner occurring on use of the device according to FIGS. 1 and 2. Releasing may be obtained by ramming the element 1 further into the hole. The recess 3 is designed in FIG. 4 so that it only allows a small counter clockwise rotation of toothed wheel 5 but it would of course also be possible to make the recess larger upwardly as viewed in FIG. 4, should this be desirable to secure the element in holes having a larger diameter.

Figure 5:
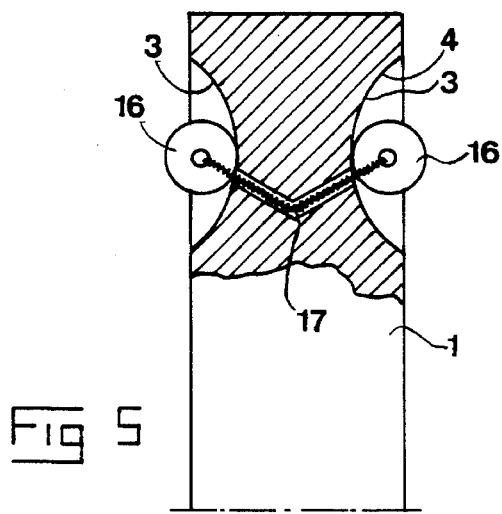
FIG. 5 is a simplified, partly cut side view of the extreme end portion of a fourth preferred embodiment of the device according to the invention.

A fourth embodiment of the device according to the invention is illustrated in FIG. 5. Each of two toothed wheels 16 is arranged in a recess 3 and these toothed wheels 16 are interconnected by a tension spring 17 tending to retain the toothed wheels 16 as far as possible into the recesses 3. After introduction of element 1 into a hole, one of the toothed wheels 16 is brought into engagement with the hole wall, whereupon the element is drawn in a direction out of the hole. The toothed wheel in question will then rotate under displacement on the surface 4 of recess 3 towards the extreme end 8. This causes this toothed wheel to finally press the second toothed wheel into contact with the opposite part of the hole wall, whereupon also said other toothed wheel will tend to move towards the extreme end 8. Thus, the left toothed wheel in FIG. 5 will then tend to rotate clockwise and the right counter clockwise. Thus, a wedge action on two parts of the element 1 located laterally opposite to each other will be obtained by this arrangement of the toothed wheel 16 and a very efficient securing of the element in the hole. Releasing may be obtained by impacts on the end of element 1 projecting out of the hole, whereby the tension spring 17 assists in retracting the toothed wheels 16 to the bottoms of recesses 3.

Figure 6:
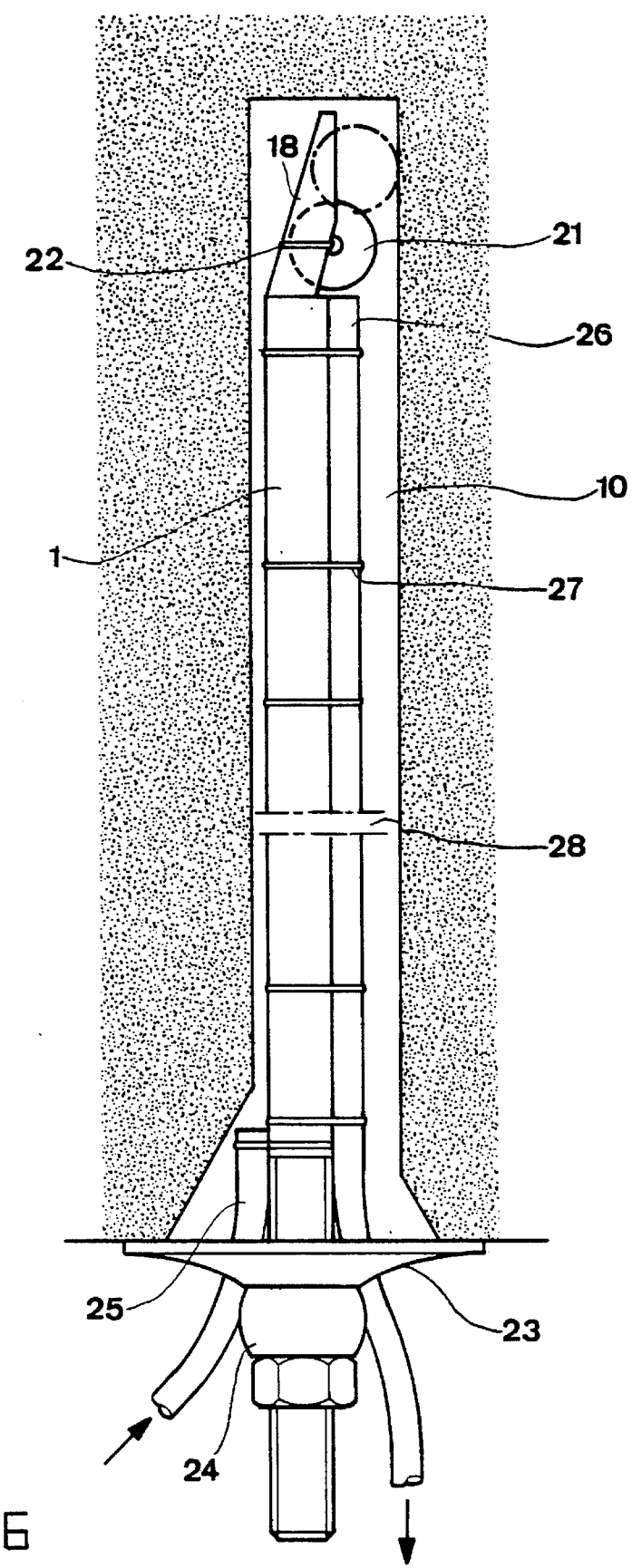
FIG. 6 is a simplified, partly cut side view of a fifth preferred embodiment of the device according to the invention.
Figure 7:
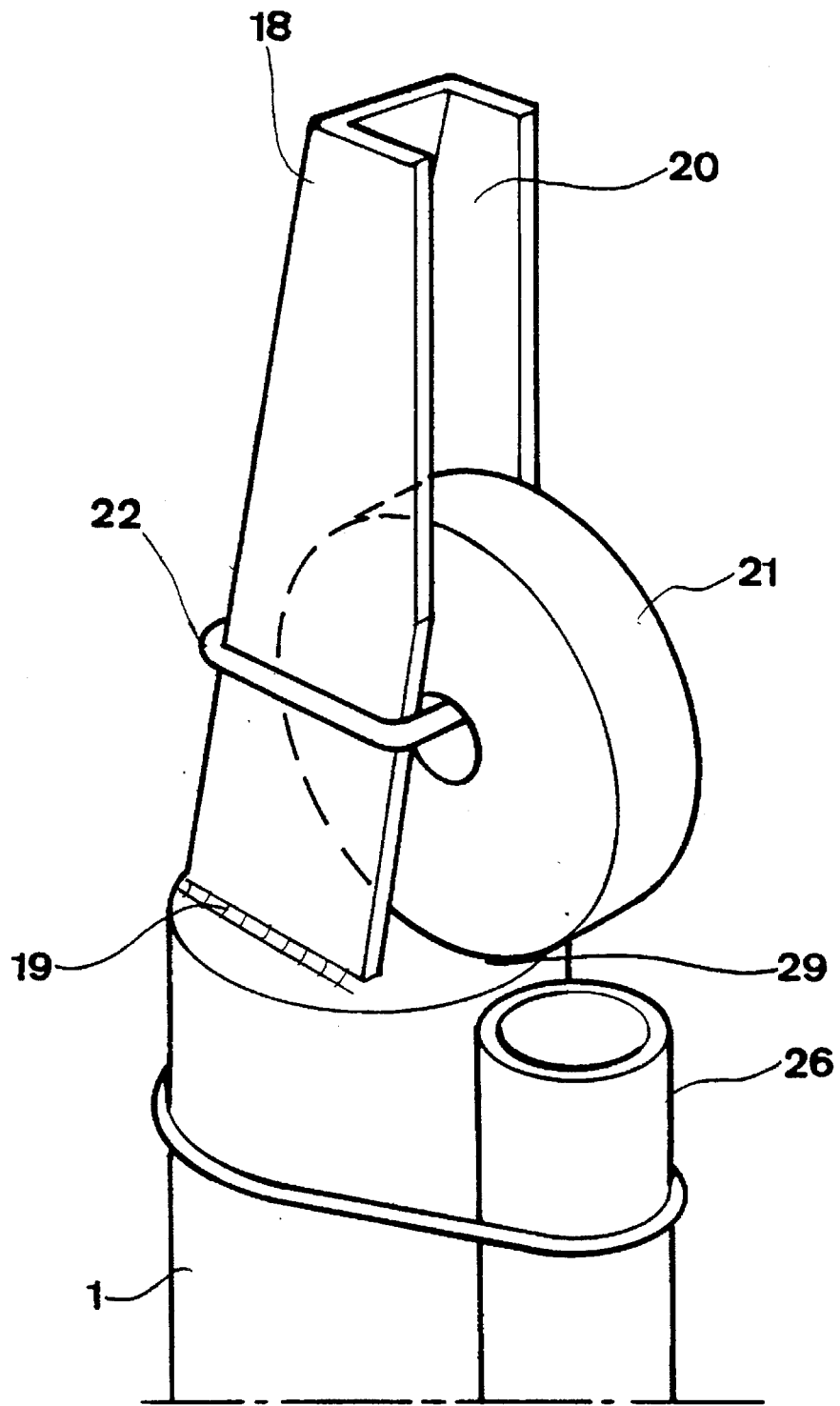
FIG. 7 is a detailed view of the extreme end portion of the device according to FIG. 6.

A fifth embodiment of the device according to the invention is illustrated in FIGS. 6 and 7. In this embodiment a piece 18, which corresponds to the recess 3 of the other embodiments, having a substantially U-shaped cross section is welded at 19 to the extreme end of element 1. Piece 18 is cut so that the line 19 of attachment forms an angle smaller than 90° with the bottom of the groove (see FIG. 6) formed in piece 18. A roller 21, preferably a rubber roller, is received in the groove 20 of piece 18. Roller 21 is retained in groove 20 by a rubber band 22, which is pretensioned in the position of rest illustrated in FIG. 7. A welding spot or the like may be arranged on that side of piece 18 which is opposite to the bottom of groove 20 external of piece 18 to retain the rubber band in place, but it is also possible that the rubber band is designed with such a pretensioning that roller 21 also during this displacement upwardly (in FIG. 6) in groove 20 is retained therein by the rubber band.

The elongated element 1 extends through a support washer 23 adapted to be moved to abutment around the opening of a bore hole 10, in which element II is to be secured. Furthermore, element 1 is at support washer 23 connected to a rotation ball 24. The support washer 23 comprises two openings, through which a first hose 25 secured to element 1 just behind the support washer and a second hose 26 extending along substantially the entire element 1 and terminating at its end portion extend. The two hoses are attached to element 1, preferably by steel wire 27. The elongated element 1 may in practice be more than four meters long, whereas its diameter may be for instance about 25 mm, for what reason a large part of the device in FIG. 6 is cut away at 28. The same is of course applicable to the surrounding rock wall, although this is not illustrated.

The function of the fifth embodiment of the device according to the invention is as follows: when the anchoring device is to be secured in a bore hole in the rock, it is introduced into the bored hole until support washer 23 contacts the rock. Element 1 is then preferably held so that roller 21 is out of contact with the internal wall of the bore hole but if such contact would occur, the end surface 29 of element 1 acts as a previously described stop member and prevents the roller from rolling out of groove 20. The device is then moved sidewardly so that the roller 21 contacts the inner wall of the bore hole and then the element is drawn in a direction out of the hole while the roller 21 rolls in the groove 20 of piece 18 and the combined diameter of the element and roller increases. This combined diameter will finally correspond to the diameter of the bore hole and additional traction in element 1 in a direction out of the hole will additionally press the anchoring device to be secured in the hole. Thus, the device now hangs safely on place in the hole. In this position the support washer is screwed so that it again comes into contact with the rock surrounding the opening of the bore hole 10. A casting compound is then injected into the bore hole through the first hose 25 and fills the hole. When the entire bore hole is filled with casting compound, the compound will emit water which then leaks out through the second hose 26 and indicates that hole 10 is filled with casting compound, whereupon the supply thereof through the first hose 25 is interrupted. The casting compound has the purpose to reinforce the rock wall and allow application of larger loads on the element 1 than otherwise would be possible. The casting compound is preferably a concrete mass. Thus, the function of the anchoring device according to the invention is restricted in time in this embodiment. Thus, the device has the purpose to retain element 1 in place during casting, whereas the cast mass retains the element 1 on place in the rock when it has hardened.

The movable parts in the embodiment examples described hereinabove are preferably made of a material deformable to some degree, such as hard rubber, so that the wedging action is enhanced, but also entirely rigid materials are conceivable.

The invention is of course not restricted to the preferred embodiments described hereinabove, but numerous possibilities for modifications thereof should be obvious to a man skilled in the art without having to deviate from the basic concept of the invention.

The cross section shape of the elongated element could for instance be other than circular, e.g. square, in case the hole in which the element is to be secured would require that.

The transverse dimensions of the element could correspond to those of the hole, in which case the movable part would not project more transversely than the element on introduction into the hole and the friction between the movable part and the hole wall would be prevented from causing wedging on introduction by means of stop members but would cause such wedging on attempt to retract the element.

It is not necessary that the movable part is arranged at one end portion of the element but the movable part could very well be disposed at any other location, e.g. at the middle of the element. Furthermore, more than one movable part could be arranged, e.g. two pairs of movable parts distributed along the length of the elongated element. When the movable element is formed by a roller, this could of course have a substantially even mantle surface, which also could be the case in the embodiment last described.

There are of course numerous possibilities to arrange a part at an elongated element so that the part on generation of friction to a hole wall moves with its extreme lateral boundary away from the center axis of the element for increasing the combined transverse dimension of the element and part, and the embodiments described hereinabove are only to be understood as non-restricting examples on how to realize this inventive concept.

The term elastic member comprises all types of members which can be extended while storing potential energy. Also a helical spring made by a solid material is in this connection also considered as extendable and accordingly to be an elastic member.

Another field of use for the device according to the invention is rock reinforcement, in connection with which the elongated element may operate as a rock bolt to enable concrete casting.

I claim:

1. An anchoring device comprising an elongated element (1) having a longitudinal axis and adapted for insertion into a hole (10) by movement along the longitudinal axis and securing means for securing the element against withdrawal from the hole, characterized in that said securing means comprises at least one part (5, 13, 16) movably connected by a resilient member to the elongated clement (1) such that the resilient member serves to connect the movable part to the elongated element and also facilitates both the anchoring of the device in the hole and the release of the device from the hole, the movable part being adapted to protrude laterally, relative to a transverse axis, beyond the periphery of the element to be movable into contact with a wall (12) of the hole, and further adapted to move, along the longitudinal axis and relative to the element (1) in response to a retractive force exerted on the element (1) and a frictional force exerted between the part and the wall (12) of the hole while increasing the transverse dimension of the device and thereby securing the element within the hole and further adapted to retract relative to the element in response to an impact force applied to the element along the longitudinal axis, thereby permitting release of the device from the hole.

2. A device according to claim 1, characterized in that the securing means further comprises a lateral recess (3) in the element adapted for receiving at least a portion of the movable part and that the part is adapted to move within the recess and in a direction into the hole, in response to the retractive force exerted on the element (1).

3. A device according to claim 2, further comprising means (9, 14, 7) for preventing movement of the movable part (5, 13, 16) in a direction out of the recess (3) on generation of friction between outer portions of the part and the wall of the hole when introducing the element into the hole.

4. A device according to claim 2 characterized in that the recess (3) comprises a surface (4) extending obliquely relative to the longitudinal axis and outwardly towards the periphery of the element and in the direction out of the hole, and that the movable part (5, 13, 16) is adapted to move along said surface on said withdrawal of the element.

5. A device according to claim 4, characterized in that the angle of the surface in relation to the longitudinal direction of the element increases progressively towards the periphery of the element.

6. A device according to claim 2, further comprising a stop member (9, 14) arranged in connection with the recess (3), said stop member being adapted to prevent movement of the movable part (5, 13) out of the recess (3) in the direction out of the hole.

7. A device according to claim 1 wherein the resilient member comprises an elastic member (7, 17) is adapted to hold the part in the recess (3) and counteract movement of the part out of the recess.

8. A device according to claim 7, characterized in that the elastic member (7) is connected to the part (5, 13) and laid round the elongated element.

9. A device according to claim 2 characterized in that the movable part is a rolling element adapted to roll, on retraction of the element (1) in the direction out of the hole (10), along a surface (4) of the recess (3).

10. A device according to claim 1 characterized in that the element (1) is designed to be secured in holes (10) having a larger transverse dimension than the corresponding transverse dimension of the element (1) and laterally protruding movable part (5, 13, 16), and the movable part is adapted to be brought into contact with a wall of the hole by movement laterally of the element introduced into the hole.

11. A device according to claim 7 characterized in that the elastic member is a spring member (17) adapted to act between the element (1) and movable part (16) and retain the same against the element and counteract movement of the movable part relative to the element in a direction opposite to the direction of introduction of the movable part on introduction thereof into a hole.

12. A device according to claim 11, comprising two movable parts (16), which each are arranged in their own recess, which are arranged on laterally opposite sides of the element, and that the spring member is a tension spring (17) having each end attached to a movable part and adapted to accumulate a minimum amount of energy when the parts are located as deep within the respective recesses as possible.

13. A device according to claim 7 wherein the elastic member comprises a rubber band.

14. A device according to claim 7 wherein the elastic member comprises a spring.

15. A device according to claim 9 wherein the rolling element comprises a toothed wheel.

16. An anchoring device, comprising an elongated element having a longitudinal axis and adapted for insertion into a hole by movement along the longitudinal axis, and securing means for securing the element to a wall of the hole, said securing means including a guide surface inclined relative to the longitudinal axis and into the hole, a resilient member, and a roller element seated against the guide surface and movably connected said resilient member to the elongated element such that said resilient member connects said roller element to said elongated element for facilitating both the anchoring of the device in the hole and the release of the device from the hole, said roller element being adapted to protrude laterally above the guide surface relative to the longitudinal axis, and further adapted to roll along the guide surface relative to the longitudinal axis in response to a retractive force exerted on the element and a frictional force exerted between the roller element and the wall of the hole, to thereby secure the element from withdrawing from the hole and being further adapted to retract relative to the element in response to an impact force applied to the elongated element along the longitudinal axis, thereby permitting release of the device from the hole.

17. A removable anchoring device, including an elongated element having a longitudinal axis and adapted for insertion into a hole by movement along the longitudinal axis, and securing means, coupled to the elongated element, for securing the element to a wall of the hole, said securing means comprising a guide surface inclined relative to the longitudinal axis and into the hole, a movable part seated against the guide surface in an insertion position, and adapted to protrude laterally above the guide surface relative to the longitudinal axis, and further adapted to move along the guide surface relative to the longitudinal axis in response to a retractive three exerted on the element and a frictional force exerted between the movable part and the wall of the hole, and an elastic member connected between the movable part and the element and biased to hold the part against the surface and counteract movement of the part relative to the longitudinal axis, for returning the part to the insertion position in response to an impact force applied to the elongated element along the longitudinal axis, thereby permitting release of the device from the hole.

18. An anchoring device for securing an elongated member inserted into a hole having a wall, the elongated member having an outer surface and having a first end inserted within the hole and a second end projecting from the hole, said anchoring device comprising, a surface extending radially inwardly from said outer surface to define a guide surface;

at least one substantially circular roller connected to a resilient member, said roller being biased against said guide surface by said resilient member so as to project a lateral distance beyond said outer surface of the elongated member in an inserting position; and wherein a combined lateral and longitudinal movement of the elongated member in a withdrawing direction relative to the hole causes said circular roller to rotate along said guide surface to a withdrawing position in which said roller projects a greater lateral distance beyond the surface of the elongated member and engages the wall of the hole, said roller preventing further disengagement of the elongated member from the hole.

* * * * *